(12) United States Patent
Greenwood et al.

(10) Patent No.: US 7,553,888 B2
(45) Date of Patent: Jun. 30, 2009

US007553888B2

(54) AQUEOUS DISPERSION

(75) Inventors: Peter Greenwood, Göteborg (SE); Hans Lagnemo, Göteborg (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/683,350

(22) Filed: Oct. 14, 2003

(65) Prior Publication Data

US 2004/0097600 A1 May 20, 2004

(30) Foreign Application Priority Data

Oct. 14, 2002 (EP) .................................. 02445132

(51) Int. Cl.
*C08K 7/18* (2006.01)
(52) U.S. Cl. ..................................... 523/212; 524/493
(58) Field of Classification Search ................. 523/212; 524/493
See application file for complete search history.

(56) References Cited

U.S. PATENT DOCUMENTS

| | | | |
|---|---|---|---|
| 2,630,410 A | 3/1953 | Clapsadle | 252/313 |
| 4,927,749 A | 5/1990 | Dorn | 435/2 |
| 5,013,585 A | 5/1991 | Shimizu | 427/220 |
| 5,368,833 A | 11/1994 | Johansson | 423/338 |
| 5,651,921 A | 7/1997 | Kaijou | 252/309 |
| 5,853,809 A * | 12/1998 | Campbell et al. | 427/407.1 |
| 6,399,211 B2 | 6/2002 | Lewis | |
| 6,479,203 B1 * | 11/2002 | Tashiro et al. | 430/104 |
| 6,727,309 B1 | 4/2004 | Paiva et al. | |
| 6,793,728 B1 * | 9/2004 | Davies et al. | 106/600 |
| 2001/0024719 A1 | 9/2001 | Lewis | |

FOREIGN PATENT DOCUMENTS

| | | |
|---|---|---|
| EP | 0216047 | 4/1987 |
| EP | 1078897 | 4/1991 |
| EP | 0550915 | 2/2001 |
| EP | 1215253 | 6/2002 |
| GB | 1342787 | 1/1974 |
| JP | 56-086980 | 7/1981 |
| JP | 62-178384 * | 8/1987 |
| JP | 3-31380 A | 6/1989 |
| JP | 06-234919 | 8/1994 |
| JP | 7-502058 | 3/1995 |
| JP | 7-86183 | 9/1995 |
| JP | 08-012903 | 1/1996 |
| WO | WO 93/11183 | 6/1993 |
| WO | 00/55260 * | 9/2000 |
| WO | 01/87788 | 11/2001 |
| WO | WO 2004/033575 A1 | 4/2004 |

OTHER PUBLICATIONS

Patent Abstracts of Japan, Pub. No. 03031380, Pub. Date Feb. 12, 1991,; Applicant: Daihachi Chem Ind Co Ltd.
English language abstract of JP 03258878.
Iler, Ralph K., The Chemistry of Silica; John Wiley & Sons (1979); pp. 407-409.
Iler and Dalton, "Degree of Hydration of Particles of Colloidal Silica in Aqueous Solution," J. Phys. Chem. 60(1956), pp. 955-957.
Chu, L. et al., Use of (Glycidoxypropyl)trimethoxysilane as a Binder in Colloidal Silica Coatings, American Chemical Society, Chem. Mater., 1997, vol. 9, pp. 2577-2582.
Patent Abstracts of Japan abstracting JP 56-086980.
Patent Abstracts of Japan abstracting JP 08-012903.
Patent Abstracts of Japan abstracting JP 06-234919.
English language translation of the Japanese Office Action for Japanese Application 2004-545122.

* cited by examiner

*Primary Examiner*—Kuo-Liang Peng
(74) *Attorney, Agent, or Firm*—David J. Serbin; Robert C. Morriss

(57) ABSTRACT

The invention relates to a method of producing an aqueous dispersion comprising mixing at least one silane compound and colloidal silica particles to form silanized colloidal silica particles, mixing said silanized colloidal silica particles with an organic binder to form the dispersion. The invention also relates to a dispersion obtainable by the method, and the use thereof.

18 Claims, No Drawings

AQUEOUS DISPERSION

The present invention relates to a stable substantially aqueous dispersion comprising silanized colloidal silica particles and an organic binder, a method of producing such dispersion, and the use thereof.

BACKGROUND OF THE INVENTION

Colloidal silica compositions have been used for a long time, e.g. as a coating material to improve adhesive properties and increase wear and water resistance of various materials. However, these compositions, especially highly concentrated colloidal silica compositions, are liable to gelling or precipitation of silica, which considerably shortens the storage time. WO01/87788 discloses a method of providing a silica glass coating comprising a cellulose-based binder and silica sols. However, such coating compositions cannot be stably dispersed for a long period of time which often necessitate immediate use thereof.

It would be desirable to provide a stable and highly concentrated colloidal silica dispersion for inter alia coating applications which can be easily stored and transported without any initial precipitation, and that can be used in applications requiring improved adhesive properties, wear resistance, and/or water resistance. It would also be desirable to provide a convenient and inexpensive method of producing such a dispersion. An object of the present invention is to provide such a stable dispersion which minimises the environmental impact without reducing the imparted effect of the dispersion.

THE INVENTION

The invention relates to a method of producing a stable substantially aqueous dispersion comprising mixing at least one silane compound and colloidal silica particles to form silanized colloidal silica particles, mixing said silanized colloidal silica particles with an organic binder to form the stable substantially aqueous dispersion.

This method can be performed without environmental hazard and health problems for process operators handling the components of the dispersion.

The mixing of silane and colloidal silica particles is preferably carried out continuously, preferably at a temperature from about 20 to about 95, more preferably from about 50 to about 75, and most preferably from about 60 to about 70° C. Preferably, silane is slowly added to the silica particles under vigorous agitation at a temperature of about 60° C. and at a controlled rate, which suitably is from about 0.01 to about 100, preferably from about 0.1 to about 10, more preferably from about 0.5 to about 5, and most preferably from about 1 to about 2 silane molecules per $nm^2$ colloidal silica surface area (on the colloidal silica particles) and hour. The addition of silane can be continued for any suitable time depending on the addition rate, amount of silane to be added, and degree of desired silanisation. However, the addition of silane is preferably continued for about 5 hours, more preferably for about 2 hours until a suitable amount of silane has been added. The amount of added silane to the colloidal silica particles suitably is from about 0.1 to about 6, preferably from about 0.3 to about 3, and most preferably from about 1 to about 2 silane molecules per $nm^2$ surface area of the colloidal silica particles. Continuous addition of silane to the colloidal silica particles may be particularly important when preparing highly concentrated silanized silica sols having a silica content up to about 80 wt %. However, the silica content suitably is from about 20 to about 80, preferably from about 25 to about 70, and most preferably from about 30 to about 60 wt %.

Preferably, colloidal silica particles and silane are mixed in a weight ratio of silane to silica of from about 0.01 to about 1.5, more preferably from about 0.05 to about 1, and most preferably from about 0.10 to about 0.5.

Preferably, the silane compound is diluted before mixing it with the colloidal silica particles, preferably with water to form a premix of silane and water, suitably in a weight ratio of from about 1:8 to about 8:1, preferably from about 3:1 to about 1:3, and most preferably from about 1.5:1 to about 1:1.5. The resulting silane-water solution is substantially clear and stable and easy to mix with the colloidal silica particles. At continuous addition of silane to the colloidal silica particles, the mixing preferably continues from about 1 second to about 30 minutes, preferably from about 1 minute to about 10 minutes after the addition of silane stopped.

The mixing according to the invention may be carried out at a pH from about 1 to about 13, preferably from about 6 to about 12, more preferably from about 7.5 to about 11, and most preferably from about 9 to about 10.5.

By the term "stable", particularly in the context of a "stable dispersion" is meant a stable compound, mixture or dispersion that does not substantially gel or precipitate within a period of preferably at least about 2 months, more preferably at least about 4 months, and most preferably at least about 5 months at normal storage in room temperature, i.e. at a temperature from about 15 to about 35° C.

Preferably, the relative increase in viscosity of the dispersion two months after the preparation thereof is lower than about 100%, more preferably lower than about 50%, and most preferably lower than about 20%. Preferably, the relative increase in viscosity of the dispersion four months after the preparation thereof is lower than about 200%, more preferably lower than about 100%, and most preferably lower than about 40%.

Colloidal silica particles, also referred to as silica sols herein, may be derived from e.g. precipitated silica, micro silica (silica fume), pyrogenic silica (fumed silica) or silica gels with sufficient purity, and mixtures thereof.

Colloidal silica particles and silica sols according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, preferably from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles suitably have an average particle diameter ranging from about 2 to about 150 nm, preferably from about 3 to about 50 nm, and most preferably from about 5 to about 40 nm. Suitably, the colloidal silica particles have a specific surface area from about 20 to about 1500, preferably from about 50 to about 900, and most preferably from about 70 to about 600 $m^2/g$.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are suitably dispersed in an aqueous solvent, suitably in the presence of stabilising cations such as $K^+$, $Na^+$, $Li^+$, $NH_4^+$, organic cations, primary, secondary, tertiary, and quaternary amines, or mixtures thereof so as to form an aqueous silica sol. However, also dispersions comprising organic solvents, e.g. lower alcohols, acetone or mixtures thereof may be used, suitably in an amount of from about 1 to about 20, preferably from about 1 to about 10, and most preferably from about 1 to about 5 volume percent of the total solvent volume. However, aqueous silica sols without any further solvents are preferably used. Preferably, the colloidal silica particles are negatively charged. Suitably, the silica content in the sol is from about 20 to about 80, preferably from about 25 to about 70, and most preferably from about 30 to about 60 wt %. The higher the silica content, the more concentrated the resulting silanized colloidal silica dispersion. The pH of the silica sol suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11.

The silica sol preferably has an S-value from about 20 to about 100, more preferably from about 30 to about 90, and most preferably from about 60 to about 90.

It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60(1956), 955-957 by Iler, R. K. & Dalton, R. L.

The S-value depends on the silica content, the viscosity, and the density of the colloidal silica particles. A high S-value indicates a low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

The silane compounds can form stable covalent siloxane bonds (Si—O—Si) with the silanol groups or be linked to the silanol groups, e.g. by hydrogen bondings, on the surface of the colloidal silica particles. Thus, by this method, the silica particles are surface-modified.

Suitable silane compounds include tris-(trimethoxy)silane, octyl triethoxysilane, methyl triethoxysilane, methyl trimethoxysilane; isocyanate silane such as tris-[3-(trimethoxysilyl)propyl]isocyanurate; gamma-mercaptopropyl trimethoxysilane, bis-(3-[triethoxysilyl]propyl)polysulfide, beta-(3,4-epoxycyclohexyl)-ethyl trimethoxysilane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, vinyltriethoxy silane, hexamethyldisilizane, and mixtures thereof. U.S. Pat. No. 4,927,749 discloses further suitable silanes which may be used in the present invention. The most preferred silanes, however, are epoxy silanes and silane compounds containing a glycidoxy or glycidoxypropyl group, particularly gamma-glycidoxypropyltrimethoxysilane and/or gamma glycidoxypropyltmethyldiethoxysilane.

An organic binder is subsequently mixed with the dispersion of silanized colloidal silica particles. The term "organic binder" includes latex, water soluble resins and polymers and mixtures thereof. Water soluble resins and polymers can be of various types such as e.g. poly(vinyl alcohols), modified poly(vinyl alcohols), polycarboxylates, poly(ethylene glycols), poly(propylene glycols), polyvinylpyrrolidones, polyallylamines, poly(acrylic acids), polyamidamines polyacrylamides, polypyrroles, proteins such as casein, soybean proteins, synthetic proteins, polysaccharides such as cellulose derivatives including methylcelluloses, ethylcelluloses, hydroxyethylcelluloses, methylhydroxyethylcelluloses, ethylhydroxyethylcelluloses or carboxymethylcelluloses, and starches or modified starches; chitosan, polysaccharide gums such as e.g. guar gums, arabic gums, xanthan gums and mastic gums and mixtures or hybrids thereof. The term "latex" includes synthetic and/or natural latices based on emulsions of resins and/or polymers of various types, e.g. styrene-butadiene polymers, butadiene polymers, polyisoprene polymers, butyl polymers, nitrile polymers, vinylacetate homopolymers, acrylic polymers such as vinylicacrylic copolymers or styrene-acrylic polymers, polyurethanes, epoxy polymers, cellulosic polymers; e.g. micro cellulose, melamine resins, neoprene polymers, phenol based polymers, polyamide polymers, polyester polymers, polyether polymers, polyolefin polymers, polyvinyl butyral polymers, silicones such as silicone rubbers and silicone polymers (e.g. silicone oils), urea-formaldehyde polymers, vinyl polymers or mixture or hybrids thereof.

Preferably, the dispersion of silanized colloidal silica particles is added to organic binder in a weight ratio of silica to organic binder on a dry base from about 0.01 to about 4, preferably from about 0.1 to about 2, and most preferably from about 0.2 to about 1. Preferably, the components are mixed at moderate temperature, suitably from about 15 to about 35° C., preferably from about 20 to about 30° C. Preferably, the components are mixed from about 10 seconds to about 1 hour, more preferably from about 1 minute to about 10 minutes.

The invention also relates to a stable substantially aqueous dispersion comprising silanized colloidal silica particles and an organic binder obtainable by the method.

The invention further concerns a stable substantially aqueous dispersion comprising silanized colloidal silica particles and an organic binder.

The dispersion is capable of forming a coating film on various kinds of substrates.

Preferably, the dispersion has a silica content from about 1 to about 80, more preferably from about 10 to about 70, and most preferably from about 20 to about 50 wt % based on the dry material in the dispersion. Besides being more efficient in terms of stability, the dispersion has shorter time of drying after application on a material to be coated.

The energy used for drying can thus be considerably reduced. A high silica content in the dispersion is preferred as long as the silanized colloidal silica particles remain stably dispersed without any substantial aggregation, precipitation and/or gelation. This is beneficial also in view of the reduced transportation cost thereof.

Preferably, the weight ratio of the total silane content to the total silica content in the dispersion is from about 0.01 to about 1.5, more preferably from about 0.05 to about 1, and most preferably from about 0.1 to about 0.5. The total content of silica comprises silica in modified silanized silica particles and non-modified silica particles which also may be present in the prepared dispersion. The total content of silane is based on all freely dispersed silane and all linked or bound silane groups or derivatives.

The organic binder preferably is a latex, as further described herein. The total solid content of the dispersion comprising organic binder and silanized colloidal silica particles suitably is from about 15 to about 80, preferably from about 25 to about 65, and most preferably from about 30 to about 50 wt %. The weight ratio of silica to organic binder on a dry base is suitably in the range from about 0.01 to about 4, preferably from about 0.1 to about 2, and most preferably from about 0.2 to about 1.

According to a preferred embodiment, the silanized colloidal silica particles and the organic binder are present as discrete particles in the dispersion.

The stability of the dispersion facilitates the handling and application thereof in any use since it allows for storage and need not be prepared on site immediately before usage. The already prepared dispersion can thus easily be directly used. The dispersion is also beneficial in the sense that it does not involve hazardous amounts of toxic components. By "substantially aqueous dispersion" is meant a dispersion whose solvent substantially is comprised of water. The dispersion preferably does not contain any organic solvent. However, according to one embodiment, a suitable organic solvent miscible with water may be comprised in the substantially aqueous dispersion in an amount from about 1 to about 20, preferably from about 1 to about 10, and most preferably from about 1 to about 5 volume percent of the total volume. This is due to the fact that for some applications, a certain amount of organic solvents may be present without any detrimental environmental effects.

The dispersion may contain besides silanized colloidal silica particles also, at least to some extent, non-silanized colloidal silica particles depending on the size of the silica particles, weight ratio of silane to silica, type of silane compound, reaction conditions etc. Suitably, at least about 40 of the colloidal silica particles are silanized (silane-modified), preferably at least about 65, more preferably at least about 90, and most preferably at least about 99 wt %. The dispersion may comprise besides silane in the form of silane groups or silane derivatives bound or linked to the surface of the silica particles also at least to some extent freely dispersed unbound silane compounds. Suitably, at least about 40, preferably, at least about 60, more preferably at least about 75, even more preferably at least about 90, and most preferably at least about 95 wt % of the silane compounds are bound or linked to the surface of the silica particles. Thus, by this method, the silica particles are surface-modified.

Suitably, at least about 1% by number of the silanol surface groups on the colloidal silica particles are capable of binding or linking to silane groups on the silane compounds, preferably at least about 5%, more preferably at least about 10%, even more preferably at least about 30%, and most preferably at least about 50% bind or link to a silane group.

The invention also relates to the use of the dispersion in coating applications and as additives to impart increased adhesiveness, improved wear resistance, and/or water resistance to e.g. cementitious materials such as concrete. The dispersion, when used as a coating has improved hardness, sandability (polishability) and flow properties. This kind of dispersions can also offer better film properties in pigmented systems, such as paints.

The dispersion is also suitable for coating and impregnating woven and nonwoven textiles, bricks, photo paper, wood, metal surfaces such as steel or aluminium, plastic films such as e.g. polyester, PET, polyolefins, polyamide, polycarbonates, or polystyrenes; fabrics, leather, paper and paper-like materials, ceramics, stone, cementitious materials, bitumen, hard fibres, straw, glass, porcelain, plastics of a variety of different types, glass fibres for e.g. antistatic and grease-resistant finishing; as binders for nonwovens, adhesives, adhesion promoters, laminating agents, sealants, hydrophobizing agents, as binders, for example, for cork powder or sawdust, asbestos, and rubber waste; as auxiliaries in textile printing and in the paper industry; as additives to polymers as sizing agents, for example, for glass fibres; and for finishing leather.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

The silanes A and B used below are available from Crompton S. A. in Switzerland.
A: Silquest Wetlink 78 (glycidoxy-containing epoxy-silane),
B: Silquest A-187 (glycidoxy-containing epoxy-silane)

The silica sols used below available from Eka Chemicals AB, Sweden, are shown in table 1 below:

TABLE 1

| Sol No | Silica sol | Silica content (wt %) | Particle size, (nm) | Specific surface area ($m^2/g$) | Surface modification | pH |
| --- | --- | --- | --- | --- | --- | --- |
| A1 | Bindzil ® 30/220 | 30 | 12 | 220 | None | 9-10 |
| A2 | Nyacol ® 1430 LS | 30 | 11 | 240 | None | 8-9 |
| A3 | Bindzil ® 305FG | 30 | 12 | 220 | Aluminium | 9-10 |
| A4 | Nyacol ® DP 5110 | 30 | 11 | 250 | Aluminium | 6-7 |
| A5 | Bindzil ® 30/360 | 30 | 7 | 360 | None | 9-10 |
| A6 | Bindzil ® 40/130 | 40 | 22 | 130 | None | 9-10 |
| A7 | Bindzil ® 15/750 | 15 | 4 | 700 | None | 10-11 |
| A8 | Bindzil ® 40/220 | 40 | 12 | 220 | None | 9-10 |

Preparation of Silanized Colloidal Silica Dispersions

Silane samples A and B were added drop-wise to the silica sols at moderate agitation for about 5 minutes in accordance with table 2. The agitation was continued for about 2 hours. Premixed samples of water-diluted silane were prepared by mixing water and silane in equal amounts (see table 3). The mixtures were slowly agitated until clear solutions were obtained. The silane dilutions were then mixed with a silica sol under moderate agitation. All samples were prepared at room temperature, unless otherwise stated.

TABLE 2

| Silanized silica sol No | Silica sol | Colloidal silica weight (g) | Silane | Silane weight (g) | Stable silanized silica sol |
|---|---|---|---|---|---|
| 1 | A1 | 30 | A | 1 | YES |
| 2 | A2 | 30 | A | 1 | YES |
| 3 | A3 | 30 | A | 1 | YES |
| 4 | A4 | 30 | A | 1 | YES |
| 5 | A1 | 30 | B | 1 | YES |
| 6 | A3 | 30 | B | 1 | YES |
| 7 | A5 | 30 | B | 3 | YES |
| 8 | A6 | 40 | B | 2 | YES |
| 11 | A3 | 30 | B | 1 | YES |

TABLE 3

| Silanized colloidal silica No | Silica sol | Colloidal silica weight (g) | Silane diluted in water (1:1) | Weight (g) (silane-water solution; 1:1) | Stable product |
|---|---|---|---|---|---|
| 14 | A1 | 30 | B | 5 | YES |
| 15 | A5 | 30 | A | 6 | YES |
| 16 | A5 | 450 | A | 75 | YES |

Water Resistance

The water resistance of the dispersions according to the invention were evaluated by mixing 10 g of the silanized silica sols with 20 g of "soft latex", Mowilith LDM 7602S available from Celanese (cf. films 7-11,13). Films 1-4 did not contain silanized silica particles and films 5 and 6 were prepared by first mixing 0.5 g of silane:water solutions (1:1) with 20 g of the same "soft latex" and then mixing the silane-latex mixture with 9.5 g of silica sol A5. Films were cast using 2 g of the above prepared latex mixtures. The films were aged for 16 hours at room temperature. The water resistance was then evaluated by adding 2 drops of water on top of the aged films. 10 minutes after the water addition, the water impact was analysed, categorised and listed in table 4 in accordance with the following scale;
0: film "dissolved",
1: severe impact on the film
2: some impact on the film,
3: no impact.

TABLE 4

| Sample/ Film No | Silica sol | Premix of silane and silica | Water Resistance |
|---|---|---|---|
| 1 | A1 | NO | 1 |
| 2 | A3 | NO | 0 |
| 3 | A5 | NO | 1 |
| 4 | A6 | NO | 1 |
| 5 | A5 | NO, A* | 1 |

TABLE 4-continued

| Sample/ Film No | Silica sol | Premix of silane and silica | Water Resistance |
|---|---|---|---|
| 6 | A5 | NO, B** | 1 |
| 7 | 1 | YES | 2 |
| 8 | 3 | YES | 2 |
| 9 | 14 | YES | 2 |
| 10 | 15 | YES | (2)-3 |
| 11 | 16 | YES | 2-(3) |
| 13 | 8 | YES | 2 |

*0.5 g of silane A, i.e. Silquest A-187:$H_2O$ (1:1), was first added to 20 g of the soft latex (acrylic resin) and then 9.5 g of A5 (30/360). The film was cast directly after mixing the three components.
**0.5 g of silane B, i.e. Wetlink 78:$H_2O$ (1:1), was first added to 20 g of the soft latex (acrylic resin) and then 9.5 g of A5 (30/360). The film was cast directly after mixing the three components.

Table 4 shows reference films of mixtures of non-silanized silica sols and soft latex (films 1-4) which have very poor water resistance. Films 5-6, which were prepared by adding silica sol to the already prepared latex-silane mixture, also showed very poor water resistance. Films 7-11 and 13, all according to the present invention, however, show good or excellent water resistance.

Stability of the Dispersion

The stability of the dispersion of the invention and non-silanized silica dispersions were compared below using two different organic binders, namely U-801™ (a polyurethane resin emulsion from Alberdingk Boley) and Mowilith™ LDM 7602-S (an acrylic resin emulsion from Celanese). The dosage of resin was 80 g for U-801 and 100 g for Mowilith™ LDM 7602-S. The weight ratio of silica to organic binder was 0.20 and 0.40 for U-801™ and Mowilith™ LDM 7602-S respectively. The samples were stored at 40° C. to achieve an accelerating time factor of 4 than would be achieved at 20° C. The viscosity (mPas, 20° C.) was measured initially, after 1 month and 4.5 months on a Brookfield viscometer. The silanized silica particles were prepared by step-wise adding a premix of silane in water (Silquest A-187:$H_2O$ (1:1)) to the silica sol.

TABLE 5

| Silanized sol No | Starting sol, according to table 1 | weight ratio silane/colloidal silica |
|---|---|---|
| B1 | A7 | 0.40 |
| B2 | A7 | 0.53 |
| B3 | A7 | 0.80 |
| B4 | A8 | 0.15 |
| B5 | A8 | 0.23 |
| B6 | A5 | 0.20 |
| B7 | A5 | 0.40 |

TABLE 6

| No | Organic binder | pH (20° C.) | Silica sol | Weight ratio; Colloidal SiO$_2$ to organic binder | Initial viscosity (mPas) | 1 month viscosity (mPas) | 4.5 months viscosity (mPas) |
|---|---|---|---|---|---|---|---|
| 1 | U-801 | 9.3 | A7 | 0.20 | Gelled after 3 h | — | — |
| 2 | U-801 | 9.8 | A7 | 0.40 | Gelled after 3 h | — | — |
| 4 | U-801 | 9.9 | B1 | 0.40 | 12 | 12 | 12 |
| 5 | U-801 | 9.4 | B2 | 0.20 | 20 | 16 | 20 |
| 6 | U-801 | 10.0 | B2 | 0.40 | 13 | 13 | 11 |
| 7 | U-801 | 9.5 | B3 | 0.20 | 18 | 17 | 19 |
| 8 | U-801 | 10.0 | B3 | 0.40 | 12 | 10 | 12 |
| 9 | U-801 | 8.3 | A8 | 0.20 | Gelled after 3 h | — | — |
| 10 | U-801 | 8.5 | A8 | 0.40 | Gelled after 3 h | — | — |
| 12 | U-801 | 8.7 | B4 | 0.40 | 27 | 24 | 27 |
| 13 | U-801 | 8.4 | B5 | 0.20 | 37 | 46 | 43 |
| 14 | U-801 | 8.8 | B5 | 0.40 | 25 | 22 | 26 |
| 15 | LDM 7602 | 8.4 | A5 | 0.20 | Gelled after 7 days | — | — |
| 16 | LDM 7602 | 8.7 | A5 | 0.40 | Gelled after 14 days | — | — |
| 18 | LDM 7602 | 9.1 | B6 | 0.40 | 7 | 6 | 7 |
| 20 | LDM 7602 | 9.2 | B7 | 0.40 | 7 | 6 | 7 |

As can be seen in table 6, the storage stability of the dispersions according to the invention is excellent, whereas the comparative dispersions A5, A7, and A8 (comprising non-silanized silica particles) become unstable and gel to a solid body only after a short period of time.

The invention claimed is:

1. A method of producing a stable aqueous dispersion without the presence of any water-miscible organic solvents or optionally comprising one or more water-miscible organic solvents, if present, in a total amount of up to 20% by volume of the total volume, said method comprising mixing at least one silane compound and colloidal silica particles, said colloidal silica particles being present in a sol having an S-Value from about 30 to about 90 and a silica content is from about 20 to about 80 wt %, in an aqueous solvent to form silanized colloidal silica particles, mixing in said aqueous solvent comprising silanized colloidal silica particles a latex to form said stable aqueous dispersion, wherein the weight ratio of silica to latex is from about 0.01 to about 1.

2. A method according to claim 1, wherein said at least one silane compound is an epoxy silane.

3. A method according to claim 1, wherein said at least one silane compound is an epoxy silane with a glycidoxy group.

4. A method according to claim 1, wherein the method is carried out at a temperature from about 50 to about 75° C.

5. A method according to claim 1, wherein the weight ratio of silane to silica is from about 0.01 to about 1.5.

6. A method according to claim 1, wherein the weight ratio of silane to silica is from about 0.05 to about 1.

7. A method according to claim 1, wherein said at least one silane compound is an epoxy silane with a glycidoxy group, wherein the method is carried out at a temperature from about 50 to about 75° C., and the weight ratio of silane to silica is from about 0.01 to about 1.5.

8. A method according to claim 1, wherein the dispersion remains stable for at least 5 months storage at a temperature from about 15 to about 35° C.

9. A method according to claim 1, wherein the dispersion viscosity does not increase more than about 40% for a period of at least 4 months storage at a temperature from about 15 to about 35° C.

10. A method according to claim 1, wherein the one or more water-miscible organic solvents, if present, are present in a total amount of up to 5% by volume of the total volume.

11. A stable aqueous dispersion without the presence of any water-miscible organic solvents or optionally comprising one or more water-miscible organic solvents, if present, in a total amount of up to 20% by volume of the total volume, obtained by mixing at least one silane compound and colloidal silica particles, said colloidal silica particles being present in a sol having an S-Value from about 30 to about 90 and a silica content is from about 20 to about 80 wt %, to form silanized colloidal silica particles in an aqueous solvent, mixing in said aqueous solvent comprising silanized colloidal silica particles a latex to form said stable aqueous dispersion, wherein the weight ratio of silica to latex is from about 0.01 to about 1.

12. A dispersion according to claim 11, wherein the dispersion remains stable for at least 5 months storage at a temperature from about 15 to about 35° C.

13. A dispersion according to claim 11, wherein the dispersion viscosity does not increase more than about 40% for a period of at least 4 months storage at a temperature from about 15 to about 35° C.

14. A dispersion according to claim 11, wherein the one or more water-miscible organic solvents, if present, are present in a total amount of up to 5% by volume of the total volume.

15. A stable aqueous dispersion without the presence of any water-miscible organic solvents or optionally comprising one or more water-miscible organic solvents, if present, in a total amount of up to 20% by volume of the total volume, said dispersion comprising silanized colloidal silica particles and a latex, wherein the weight ratio of silica to latex is from about 0.01 to about 1 and wherein silanized colloidal silica particles are derived from a silica sol having an S-Value from 30 to 90.

16. A dispersion according to claim 15, wherein the weight ratio of silica to latex is from about 0.2 to about 1.

17. A dispersion according to claim 15, wherein the silica content is from about 20 to about 50 wt % based on the dry material in the dispersion.

18. A dispersion according to claim 15, wherein the total solid content of the dispersion is from about 25 to about 65 wt %.

* * * * *